(No Model.)

A. J. BOSTWICK.
LOGGING ROAD TOOL.

No. 465,448.

Patented Dec. 22, 1891.

Witnesses.
C. E. Van Doren.
J. Jensen.

Inventor.
Arthur J. Bostwick.
By Paul &c. Attys.

UNITED STATES PATENT OFFICE.

ARTHUR J. BOSTWICK, OF EAU CLAIRE, WISCONSIN.

LOGGING-ROAD TOOL.

SPECIFICATION forming part of Letters Patent No. 465,448, dated December 22, 1891.

Application filed February 28, 1891. Serial No. 383,161. (No model.)

*To all whom it may concern:*

Be it known that I, ARTHUR J. BOSTWICK, of Eau Claire, in the county of Eau Claire and State of Wisconsin, have invented certain Improvements in Logging-Road Tools, of which the following is a specification.

My invention relates to tools especially adapted for use in digging out sled-runner ruts in hard icy snow roads; and the object which I have in view is to provide a light and durable tool having a form similar to that of a sled-runner bottom.

My invention consists in an adz-like tool having a straight ax portion provided with an opening adapted to receive the end of an ax-helve and a second gouge-like portion integral therewith, the two being arranged end to end and connected by a short neck arranged to leave a space between the face of the ax part and the edges of said second part.

My invention will be more readily understood by reference to the accompanying drawings, in which—

Figure 1:
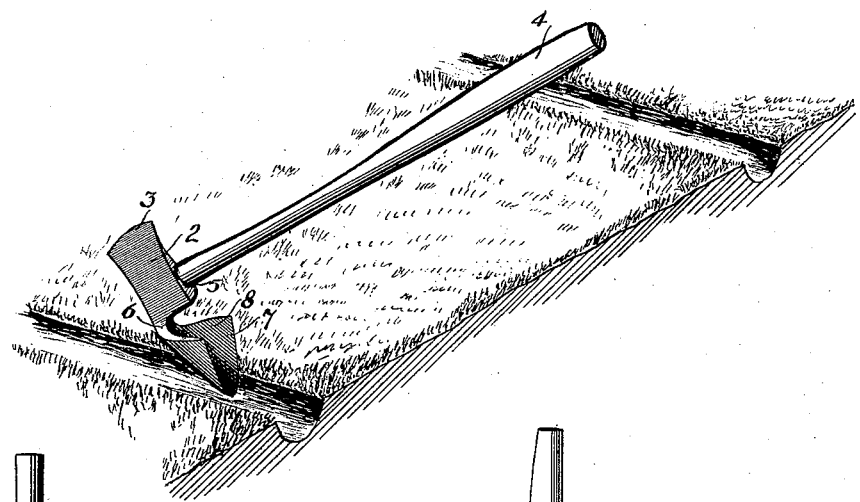
Figure 2:
Figure 3:
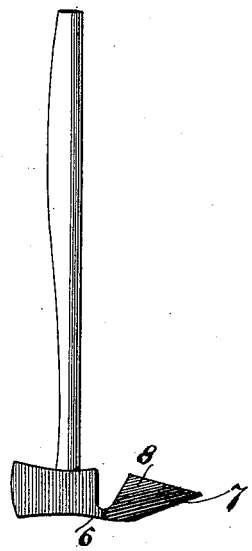
Figure 4:
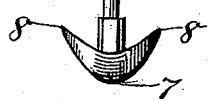

Figure 1 is a view showing one of my tools in use. Fig. 2 is an edge view of one of my tools, the gouge portion being sectioned. Fig. 3 is a side view of the same. Fig. 4 is a full edge view taken from Fig. 3.

As shown in the drawings, the ax portion is provided with a cutting-edge 3, in line with the handle or helve 4. The helve is secured in the opening 5, corresponding with the opening in an ordinary straight-ax head.

Extending from the lower edge of the straight ax 2 is the neck 6. This neck from thence spreads out into the thin adz-like cutter or gouge 7, made in a diamond-like form and having its corners or sides 8 turned up in an acute angle or curve with respect to the end or face of the ax 2. A gouge-cutter having the shape of a sled-rut is thus formed. The forward edge of this part 7 is sharpened, so as to easily cut into ice, frozen ground, small roots, or sticks. By use of the straight-edge ax any large roots or pieces of timber in the roadway may be cut away and disposed of.

The tool is especially useful in cutting out old ruts which have become filled with ice, snow, &c. To the end that a slanting cut may be obtained with the rut-cutter and the same more adapted to be easily driven into the ground the cutter is set at a slight angle with the other half or ax part of the tool, so that while the ax is left perpendicular with the helve or handle the gouge makes an acute angle therewith.

Having thus described my invention, I claim as new and desire to secure by Letters Patent—

1. In a logging-road tool, the straight-cutting portion 2, having the handle-socket, and the gouge-shaped adz-like portion having the slanting sides and edges and formed integral with said portion 2, substantially as described.

2. A logging-road tool made up of a straight-cutting portion and an adz-like gouge portion having curved sharpened cutting-edges and connected with said straight-cutting portion by the narrow neck, said tool provided with a handle-socket and said gouge portion formed at an angle with said cutting portion, substantially as and for the purpose specified.

In testimony thereto I have set my hand this 13th day of February, 1891.

ARTHUR J. BOSTWICK.

In presence of—
CHAS. A. FLEMING,
C. L. TOLLES.